(No Model.) 5 Sheets—Sheet 1.
C. W. VAN VLEET & J. P. OSBORNE.
BOX MACHINE.
No. 566,823. Patented Sept. 1, 1896.
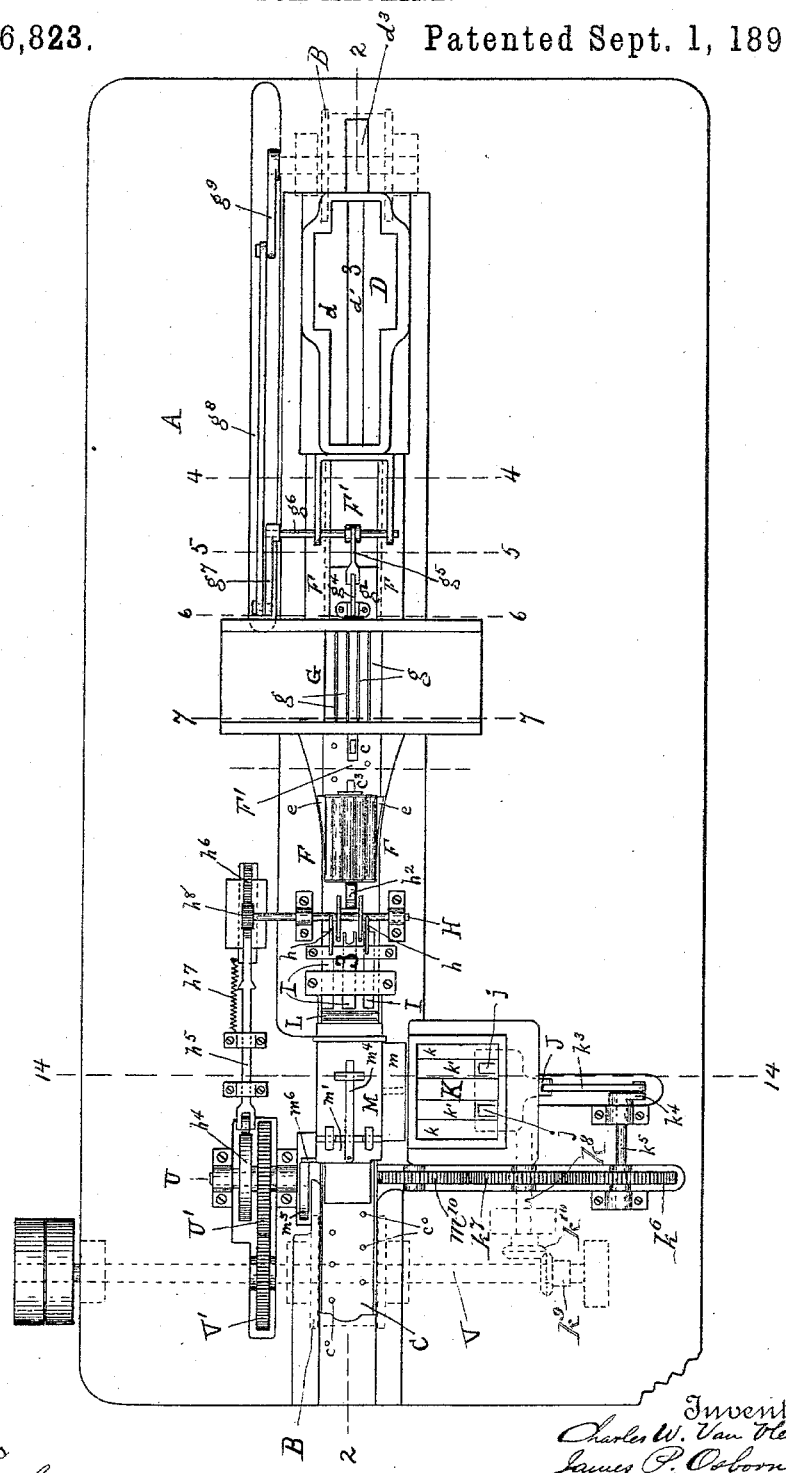
Witnesses
G. N. Pich
E. H. Marsellus.
Inventors
Charles W. Van Vleet
James P. Osborne
by Howard L. Osgood
their Attorney

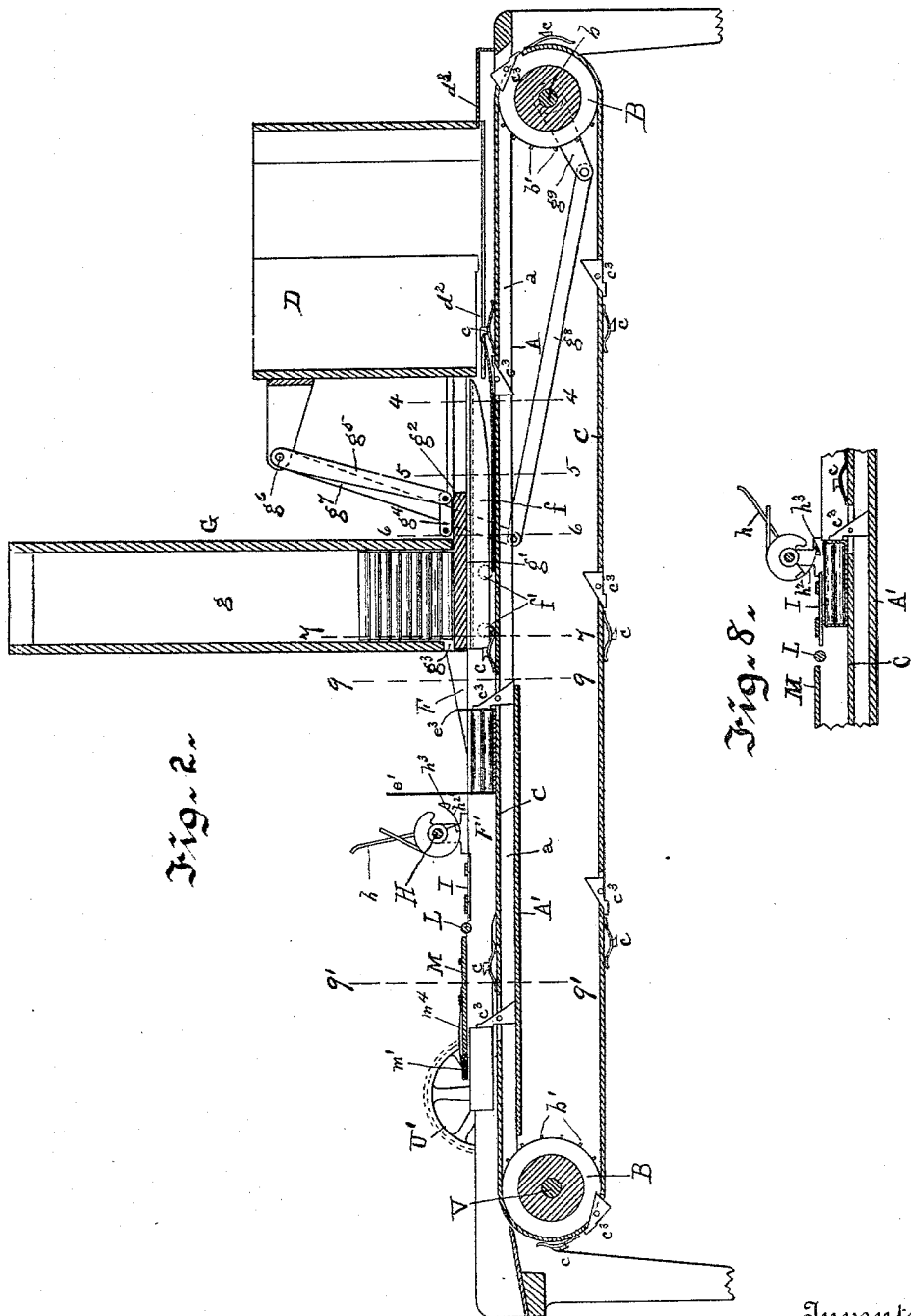

(No Model.) 5 Sheets—Sheet 3.
C. W. VAN VLEET & J. P. OSBORNE.
BOX MACHINE.
No. 566,823. Patented Sept. 1, 1896.
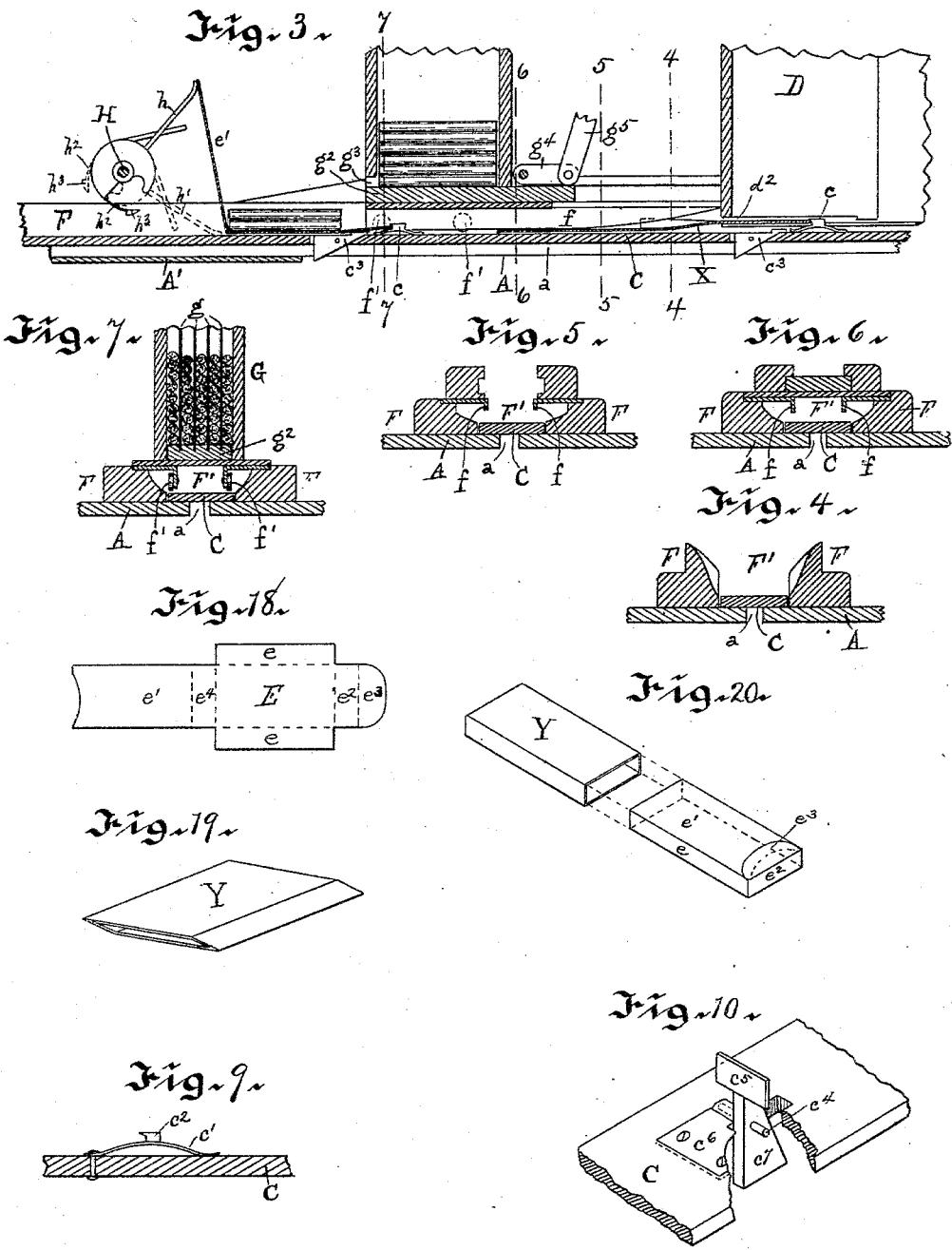

(No Model.)  5 Sheets—Sheet 4.
C. W. VAN VLEET & J. P. OSBORNE.
BOX MACHINE.
No. 566,823. Patented Sept. 1, 1896.
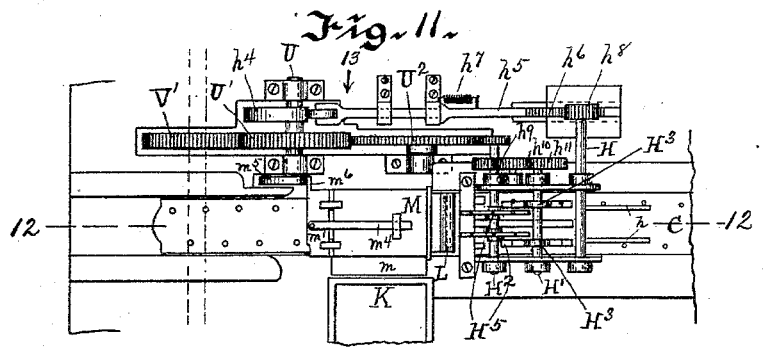
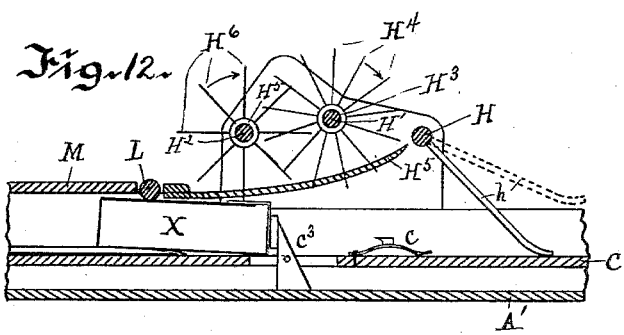
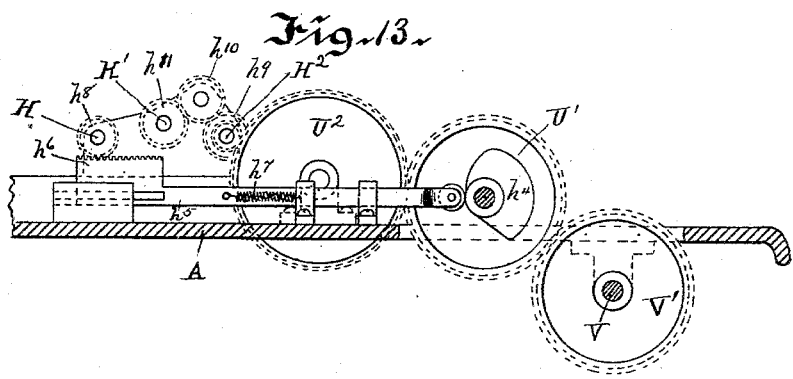

(No Model.) 5 Sheets—Sheet 5.
C. W. VAN VLEET & J. P. OSBORNE.
BOX MACHINE.
No. 566,823. Patented Sept. 1, 1896.
Fig. 14.
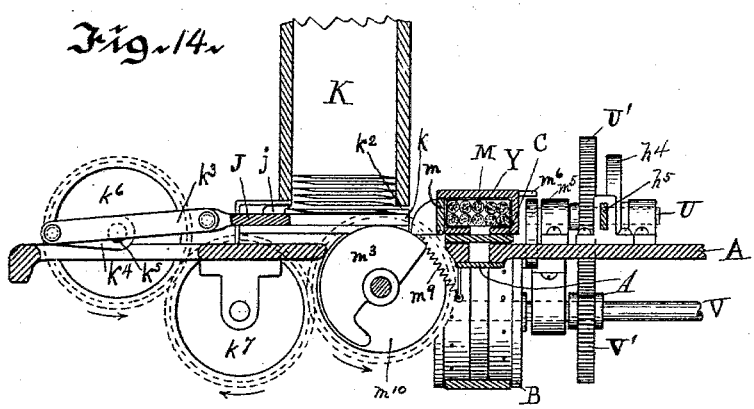
Fig. 15.
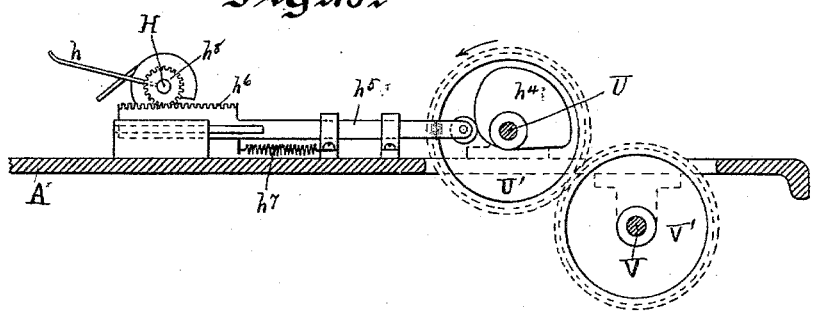
Fig. 16.
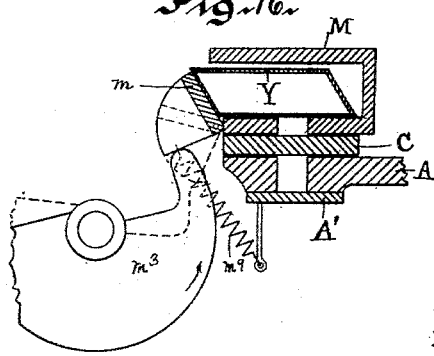
Fig. 17².
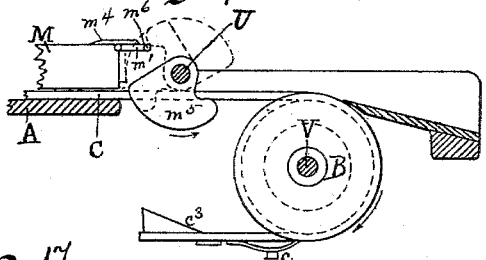
Fig. 17.
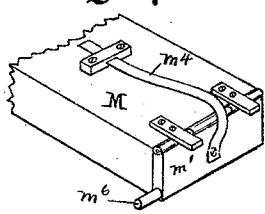
Witnesses
G. W. Pick
E. H. Marcellus
Inventors
Charles W. Van Vleet
James P. Osborne
by
Howard L. Osgood
their Attorney

UNITED STATES PATENT OFFICE.

CHARLES W. VAN VLEET AND JAMES P. OSBORNE, OF ROCHESTER, NEW YORK, ASSIGNORS OF ONE-THIRD TO WILLIAM D. BALDWIN, OF YONKERS, NEW YORK.

BOX-MACHINE.

SPECIFICATION forming part of Letters Patent No. 566,823, dated September 1, 1896.

Application filed March 21, 1894. Serial No. 504,573. (No model.)

*To all whom it may concern:*

Be it known that we, CHARLES W. VAN VLEET and JAMES P. OSBORNE, citizens of the United States, and residents of the city of Rochester, in the county of Monroe and State of New York, have invented a new and useful Box-Machine, of which the following is a specification.

Our invention is illustrated by a machine for boxing cigarettes, as hereinafter set forth. For rapidity of operation it is obvious that a continuous operation is preferable to an intermittent. Cigarettes are generally packed in bunches of ten or twenty each, inclosed in a box which is inserted in a tubular cover open at one end or at both ends. This box is formed from a blank which is received at the cigarette-factory in the flat and is so formed and creased as to be folded into the box form. The tubular covers or shells are received completely formed, but flattened for greater compactness. Both the boxes and shells are received in quantity. It is best that the flat blanks should be picked from a mass of blanks, should be folded and filled with the cigarettes, and should then have a cover or fastening placed about the folded and filled box by a continuous operation without handling. This, under the circumstances stated, involves the delivery of one box-blank at a time to the machine, either by automatic mechanism or by hand, the folding of the blank by the operation of the machine, the counting and inserting of the cigarettes into the partly or wholly formed box, the delivery of one cover at a time to the machine, and the covering said box with the tubular cover and discharging the same from the machine.

In the device hereinafter described there is a series of mechanisms combined in operation, as follows: first, a magazine containing the flat box-blanks in combination with devices for removing one blank at a time from the mass of blanks in the magazine, and means of delivering the blank to the subsequent mechanisms; second, devices for folding the box-blanks sufficiently to receive the cigarettes; third, devices for counting and delivering a fixed number of cigarettes to the box thus formed; fourth, devices for completing any necessary or desired folding of the box after it is so filled and for delivering the folded and filled box to the succeeding mechanisms; fifth, devices for taking the tubular cover, when flat, from a mass of such covers; sixth, devices for opening or squaring the cover; seventh, devices for placing the opened cover about the filled and folded box; eighth, a continuously-moving box-carrier combined with the foregoing devices, and, ninth, the combinations hereinafter described and claimed.

It is our object to produce a series of mechanisms capable of combination (and actually combined in our machine) in which the operations are continuous, so that after a blank starts from the mass of blanks it shall not be checked in its course until discharged after having been folded, filled, and covered, all by the operation of automatic machinery, and in which the only hand-labor is that which is necessary to deliver material to the respective magazines for the box-blanks, cigarettes, and covers, whereby the expense of forming, filling, and covering the boxes is much reduced, and whereby damage to the cigarettes, boxes, and covers is reduced to a minimum.

Each of the mechanisms above enumerated is capable of separation from this machine for use in combination with other devices for performing either prior or subsequent operations. The two enumerated devices for folding the box-blanks (the second and fourth) constitute one mechanism.

In the accompanying drawings, Figure 1 is a top plan view of our machine. Fig. 2 is a longitudinal vertical section thereof on the line 2 2 of Fig. 1. Fig. 3 is an enlarged vertical section on that portion of the line 2 2 of Fig. 1 between the points 3 3. Figs. 4, 5, 6, and 7 are enlarged transverse vertical sections of the folding device on the lines, respectively, 4 4, 5 5, 6 6, and 7 7 of Figs. 1, 2, and 3. Fig. 8 is a vertical longitudinal section on the line 2 2 of Fig. 1 from the line 9 9 to the line 9' 9' of Fig. 2, showing the box folded. Fig. 9 is a vertical section of the carrier-belt, showing one of the pickers thereon. Fig. 10 is a projection of a portion of the carrier-belt bearing one of the folders for an end of the box, parts being removed in the view to show construction more clearly. Fig. 11 is a top plan view of another form of folding apparatus than the one shown in the previously-mentioned figures. Fig. 12 is a vertical longitudinal section of the same on the line 12 12 of Fig. 11. Fig. 13 is a side elevation of the same, partly diagrammatic and as seen in the direction of the arrow marked 13 of Fig. 11. Fig. 14 is a cross-section on the line 14 14 of Fig. 1. Fig. 15 is an enlarged side elevation of the mechanism for operating the revolving folder of Figs. 1, 2, and 8. Fig. 16 is a partial transverse vertical section on the line 14 14 of Fig. 1, showing the cover-holder and the mechanism for opening the box-cover. Fig. 17 is a projection of the end of the cover-holder. Fig. $17^2$ is a side view of the mechanism for closing the end of the cover-holder. Fig. 18 is a plan view of a box-blank, showing in dotted lines the creased lines on which the same is bent to form the box. Fig. 19 is a projection of a flattened cover. Fig. 20 is a projection of a folded box and an opened cover.

We first describe the magazine for box-blanks and the devices for removing the blanks therefrom.

Referring to the drawings, A is a table on which the mechanism is placed. At each end of the table is a transverse shaft V and $b$, each bearing a pulley B. One or preferably each pulley has upon its periphery a series of pins $b'$ $b'$, and around these two pulleys passes a continuous belt C, having a series of perforations $c°$, engaging the pins $b'$, in order to prevent slip of the belt upon the pulley. Any suitable device for preventing slip of the belt may be provided. For instance, to each edge of the belt may be fastened a sprocket-chain, which engages sprocket-wheels fixed upon the shaft $b$ or to the pulleys B. This belt C passes through the table and over the upper surface thereof and is fixed as to height by the surface of the table, and of course the shafts V and $b$ may be made adjustable for height. A slot $a$ is cut longitudinally through the table the whole length thereof under the belt. Upon the belt at intervals of a little greater length than the length of a blank X are fastened a series of pickers $c$, consisting of a spring-base $c'$ and picking-head $c^2$. The picking-head has an edge adjacent to its upper surface and on the forward side as to its motion for removing a blank from a magazine. (See Fig. 9.) The forward end of the spring $c'$ is fastened rigidly to the belt, as by a rivet, and the other end of the spring is preferably loose in order that the picker may easily pass around the pulleys B. The spring $c'$ is bent in convex form with reference to the surface of the belt on which it is fastened in order that it may be depressible and elastic. Upon this belt also are fastened a series of folders $c^3$, pivoted to the belt by the transverse pivot $c^4$, set in a suitable bearing $c^6$, fastened securely to the belt. Each folder has a transverse head $c^5$ upon it and a lever or counterbalance $c^7$ on the other side of the pivot from the head $c^5$. The head $c^5$ is so placed with reference to the pivot that it may be laid down flat upon the surface of the belt, but that when the pivot is turned it may be raised to a position in a transverse plane at right angles to the surface of the belt, and it is also placed ahead of the picker at such a distance therefrom that when the folder is raised when a blank is being pushed by the picker-head the folder will bend the end of the blank at the line or crease arranged for forming the end of the box. Under the table, beginning at the point where in the operation of the machine it becomes necessary to raise the folder, there is a plate or guide A', against which the counterbalance or lever $c^7$ can strike and raise the transverse head into the vertical position, as shown in Fig. 8. This plate extends longitudinally toward the delivery end of the machine for such a distance that the folder is retained in the vertical position, and thus pushes the box through the machine until the operations upon the box are completed and the folded box is delivered therefrom. (See Fig. 1.)

At one end of the table is a magazine D for the flat box-blanks. This may be either vertical or inclined and is placed over the first portion of the belt which lies horizontal after turning the pulley at the entrance end of the machine. This magazine is of such internal shape that the blanks lie flat one upon the other, and it is filled with such blanks. A weight may be placed upon the pile of blanks to keep the lowest one in proper position. The magazine has a bottom $d$ having a medial longitudinal slot $d'$ therein and a throat $d^2$ on the delivery side of the magazine adjacent to the bottom of a size to permit only a single blank to pass through. The magazine is placed at such a height above the belt that the picker-head $c^2$ may pass through the slot and into the magazine. A guide $d^3$ (see Fig. 1) is placed at the entrance end of the slot $d$ and in such position with reference to the same that the picker-head as it advances to enter the slot will strike the guide $d^3$ and will be depressed upon its spring-base, so that the forward edge of the head will enter between the edge of the lowest blank in the box and the edge of the next superior blank. The forward horizontal edge of the picker-head $c^2$ acts as a wedge to enter between the edges of the lowest and the next superior blank to depress the lowest blank, to separate the two blanks, and to catch and hold the lowest blank with great certainty. The further motion of the belt will cause the picker-head to push only the lowest blank out through the throat $d^2$. The action of the sharp wedge-shaped picker-head $c^2$ separates the blanks and secures the expulsion of the lowest blank with greater certainty than if the picker were merely the edge of a pin or plate which pushed against the edge of the blank or were an edge only slightly differing from a right angle. Differences in size between the heads $c^2$ and in stiffness between the spring-bases $c'$ are unimportant, since the guide $d^3$ always directs the edge of each head accurately to place. Both the picker-heads $c^2$ and that portion of the guide $d^3$ which they touch are preferably made of tempered or hardened steel. The guide $d^3$ may be adjustable as to height in order that the exact position of the edge of the picker-head with reference to the lowest blank in the magazine D may be accurately adjusted.

We next describe the devices for partly forming the blank preparatory to receiving the cigarettes.

As each picker pushes a box-blank out from the mass of blanks in the magazine D it delivers the flat blank into forming devices for folding the box-blank. The machine herein described is adapted particularly to the form of blank shown in Fig. 18, which is cruciform, having a center part E forming the bottom of the box, side wings $e\ e$ to form the sides of the box, an end wing $e^2$ to form one end of the box, and which is continued by the flap $e^3$ to form a portion of the top of the box. On the other end of the bottom is the wing $e^4$ to form the other end of the box, and a long flap $e'$ to form a portion of the top. In Fig. 20 is shown the completely-folded box and an open cover for the same. The blank in question emerges from the magazine D with the flap $e'$ in advance. Upon the surface of the table is a channel $F'$, extending from the magazine D to the cover-holder M, hereinafter described. This channel has sides F F, which at first permit the blank to lie flat in the channel and which gradually change from the horizontal to the vertical position, as shown in the successive Figs. 4, 5, 6, and 7. The wings $e\ e$ press, on their under or outer sides, against the inner surfaces of the channel as the blank advances and are gradually folded, while being pushed forward by the picker, upon the moving belt. A guide $f$, of sled-runner form, is placed within the channel, on each side thereof, to press the blank gradually down upon the belt C along the line of the crease or bend between each wing $e$ and the bottom of the box and to prevent the blank from rising from the belt as it is pushed along by the picker, and near and on the ends of the guides $f\ f$ are rollers $f'\ f'$, Figs. 3 and 6, to reduce friction and to cause the blank to bend accurately on the lines joining the wings $e\ e$ to the bottom E. The guides F and folders $c^3$ and $h$, which fold the blank to inclose the filling material, operate externally on the box and do not occupy the interior of the box at any time. The result is the production of an open box into which the filling material may be discharged without being interfered with by the folding devices. This materially assists in producing a rapidly-acting machine.

The blanks, being creased before they are placed in the machine, are held down in the channel $F'$ by the guides F F, and the sled-runner guides $f$ are desirable, but not essential. The box, with the wings $e\ e$ raised nearly or quite into the vertical position, is now ready to receive the cigarettes. From this point the channel is of such dimensions in cross-section as to fit the box thus folded, but without too much friction or pressure. Next in order is the mechanism for counting and delivering the cigarettes into the partly-formed box. Above the channel $F'$, between the sides F F, is a magazine G, adapted to hold a mass of cigarettes, having coöperating devices for removing cigarettes therefrom. This magazine is so constructed that the cigarettes shall lie one upon the other in vertical columns separated by vertical partitions $g\ g$, and so that the transverse width of all the columns shall be the width of the bottom of the cigarette-box. In the form shown there are five of these vertical columns and the box is arranged to receive two layers of cigarettes of five in each layer. The magazine G has a bottom $g'$, under which the partly-folded box-blank moves in the channel $F'$ between the sides F F. Upon this bottom moves a plunger $g^2$, which reciprocates in line with the channel and with the belt. This plunger moves under the columns of cigarettes and is of such width and vertical thickness as to press against the ends of two layers of cigarettes when retracted for the purpose of expelling them. When the plunger is withdrawn from under the cigarettes, the cigarettes in the several columns fall upon the bottom $g'$ of the magazine. The plunger now moves forward in line with the belt and pushes two layers of cigarettes, of five in each layer, out through the throat $g^3$, which is of such size as to permit only two such layers to emerge therefrom. The speed of the plunger is adjusted to expel the cigarettes from the throat $g^3$ with substantially the same velocity as the velocity of the belt, and the plunger is operated to expel them at the exact time when the blank, folded as hereinbefore described, shall be under the cigarettes as they fall from the throat $g^3$.

In the machine shown in the drawings the folding of the side wings $e\ e$ of the box-blank is not fully completed until after the cigarettes are dropped into the partly-folded box, inasmuch as a slightly obtuse angle of the said wings with reference to the bottom is favorable to the catching of any cigarette which by accident might have been expelled from the magazine G in a direction not exactly in line with the motion of the box. The plunger $g^2$ is operated by a connecting-link $g^4$, pivoted thereto and to a connecting-rod $g^5$, which is fixed to a transverse shaft $g^6$, having a crank $g^7$, pivoted to a pitman $g^8$, which is operated by a revolving crank $g^9$ upon the shaft $b$ at the entrance end of the machine. The revolution of the crank $g^9$ causes the crank $g^7$ to oscillate and to reciprocate the plunger $g^2$ with the proper speed and at the proper time. Then follow the devices for completing the folding of the box-blank. Just before the cigarettes are placed in the partly-formed box the folding devices for the ends of the box begin to operate. Over the channel between the sides F F is a transverse shaft H, operated by mechanism hereinafter described. To this shaft is fastened a folder consisting, in the form shown, of two rods or wires $h$ $h$, fixed to the shaft and extending therefrom down to the surface of the belt, with the ends resting thereon. The box-blank, coming toward the folder with the long flap $e'$ in advance, meets these wires, and the flap $e'$ is by them picked from the surface of the belt and rides up upon them, and, as the blank still approaches the shaft H, the mechanism mentioned causes the shaft to revolve, so as to raise the folding-wires $h$, in order that the box-blank may pass under the shaft H. When the blank has passed completely out from under the magazine G, the guide $A'$ trips the folder $c^3$ and raises the head $c^5$ into a vertical position, thus folding up the end $e^2$, together with the flap $e^3$, into the vertical position and disengaging the end of the flap $e^3$ from the picker-head $c^2$. As the box-blank now advances it passes, with the end $e^4$ in advance, under the stationary guide-folders I, which are arranged above the belt at such a height as to fold the flap $e'$ upon the line of division between it and the end $e^4$. The transverse section of the channel $F'$, through which the box passes when under the folder-guides I I, is only such as to permit the box to pass through with the flap $e'$ folded down flat upon the cigarettes in the box, and as the folder $c^3$ is pushing the other end of the box the cigarettes tend to assist the folder-guides in bending the flap $e'$ on the proper line. Under the folder-guides the inner surfaces of the sides F F of the channel are vertical with reference to the surface of the belt.

The remaining operation to be performed upon the box is the folding down of the short flap $e^3$. For this operation we have used two devices, one of which is shown in Figs. 1, 2, 3, and 8, and the other of which is shown in Figs. 11 and 12, with the operating mechanism in Fig. 13. The first of these devices consists of a spring-hook fastened to the shaft H and composed of a spring $h^2$ and a head $h^3$. As soon as the vertical flap $e^3$ approaches the position underneath the shaft H this shaft is rapidly revolved, so that the side next to the box moves in the same direction as the belt, but more rapidly than the latter. The hook-head $h^3$ catches the tip of the flap $e^3$, and (being set at a distance from the center of the shaft H equal to the distance from said center to the top of the folded box) as the flap passes under the shaft the hook, moving more rapidly than the belt, turns down the flap in the same direction as the motion of the box and presses it down upon the cigarettes and upon the end of the long flap $e'$, as shown in Fig. 8. The spring $h^2$ gives a sufficient elasticity to the motion of the head to press the flap $e^3$ firmly down upon the filled box. The entrance end of the folder-guides I is so placed as to receive the folded end $e^2$ as soon as the pressure of the head $h^3$ is removed from the flap by the action of the belt. The folder $c^3$ continues to push the folded box, and the folder-guides I retain the parts in position. Upon a shaft U, driven by gears $U'$ and $V'$ from the driving-shaft V, is a cam $h^4$, which operates to reciprocate a rod $h^5$, upon which is a rack $h^6$. This rod moves in suitable guides and is actuated against the tension of a spring $h^7$. The rack $h^6$ meshes with a pinion $h^8$ upon the shaft H. The cam $h^4$ is of such form that the rod $h^5$ first moves in one direction and, on being released by the step in the cam, flies quickly back, so that the folder-rods $h$ $h$ turn with the shaft H and raise the end $e'$ of the box-blank and then the shaft revolves rapidly in the other direction to operate the hooked head $h^3$ and to produce the movements hereinbefore specified, to fold the tip $e^3$.

The other device above referred to for folding down the tip $e^3$ of the box is shown in Figs. 11, 12, and 13. It consists of two shafts $H'$ and $H^2$, transversely arranged over the channel $F'$ and between the shaft H (from which the spring-hook device hereinbefore described has been removed) and the cover-holder. These shafts $H'$ and $H^2$ are geared together to revolve at high speed and in the same direction by the small gear-wheels $h^9$, $h^{10}$, and $h^{11}$, which are actuated by the large gear-wheels $U'$ and $U^2$, geared to the driving-shaft V. The folder $h$ is left in place and turns up the long end $e'$ of the box-blank as in the use thereof before described. As soon as this end is turned upward the folder $h$ is held by the cam $h^4$, Fig. 13, in the position shown in dotted lines in Fig. 12 and folds down the long end $e'$ upon the top of the cigarettes in the box by the motion of the box thereunder. A long guide-finger $H^5$ prevents the flap $e'$ from rising too high until the box enters the orifice of the cover-holder. The shaft $H'$ nearest the entrance end of the machine has upon it two wheels $H^3$ $H^3$, each having a series of equal radial arms $H^4$, which revolve in the direction shown in the arrow in Fig. 12. The ends of the arms move much more rapidly than the box moves, and as the ends of the arms strike the vertical top $e^3$ they fold it down in the same direction as that in which the box moves. The arms are of such length as to turn the tip $e^3$ down and to press it down level. Serrations in the periphery of the folder wheel or wheels may be substituted for the radial arms shown. The second shaft $H^2$ has upon it two wheels $H^5$ and $H^5$, provided with radial arms $H^6$, which are set so that their ends hold down the tip $e^2$ as the same is released from the action of the arms $H^4$ on the shaft H'. The wheels H³ are set out of line with the wheels H⁵, and when seen from the side the arms H¹ and H⁶ overlap and pass each other, as shown in Fig. 12. One of the shafts, with its wheels, can be omitted, if so desired, and the remaining shaft will perform the operation. We prefer the last-described folder.

We next describe the mechanism for covering the filled and folded box.

The shell or cover Y is next introduced into the path of motion of the box. Near the delivery end of the machine and at one side of the channel F' is a magazine K, adapted to receive the flattened covers one upon the other, as shown in Fig. 14. This magazine has a bottom $k$, having one or more transverse slots $k'$ therein at right angles to the belt. Immediately above this bottom and upon the side next to the belt is a throat $k^2$ of a size to permit only one flattened cover at a time to emerge therethrough. Underneath the bottom $k$ is a reciprocating plunger J, having upon it one or more pickers moving in the slots $k'$ in the bottom of the magazine. The plunger has a stroke greater than the length of the slots and the pickers enter at one end of the slots, catch the edge of a single flattened cover, and push it completely out through the throat $k^2$. The pickers $j$ are similar to the picker-heads $c^2$ of the pickers on the belt and operate in a similar manner, the edge entering between the lowest cover and the next superior cover. It is obvious that the pickers $j$ may be set upon spring-bases like the picker-heads $c^2$ and may be provided with a guiding device like the guide $d^3$, and instead of the reciprocating pickers shown in connection with the magazine K a continuously-operating device bearing pickers, like the belt C, may be substituted. The plunger J is operated by a connecting-rod $k^3$, attached to a crank $k^4$ on a shaft $k^5$, which is longitudinal with reference to the table A. This shaft is driven by gearing $k^6$ $k^7$, connecting by the shaft $k^8$, through the miter-gears $k^9$ and $k^{10}$, with the driving-shaft V. Immediately over the channel F' and adjacent to the folder-guides I I is the cover-holder M. This is entirely open at the end at which the folded box enters. The top is fixed. The side next to the throat $k^2$ has a door $m$. The side opposite to the door $m$ is fixed, and the bottom is fixed, but is longitudinally slotted and is of sufficient thickness to permit the pickers $c$ to pass freely along in the slot without touching a box or cover in the cover-holder M. The bottom of the cover-holder M is preferably inclined at the entrance end, as shown in Fig. 12, so that the box may ride up on the thickened bottom and permit the pickers $c^2$ to pass along in the slot in the bottom and avoid any accidental damage to a box or cover in the cover-holder. The delivery end of the cover-holder is also a hinged door $m'$. (See Fig. 17.) As a flattened cover is delivered from the throat $k^2$ it passes directly into the cover-holder through the opened door $m$. The door $m$ is hinged at its lower edge (see Figs. 14 and 16) and is operated by a cam $m^3$, working against a spring $m^9$ to close the door, said cam being operated by the driving-shaft V through the miter-gears $k^9$ $k^{10}$, the shaft $k^8$, and the gears $k^7$ and $m^{10}$. When the door $m$ is closed, the inside of the cover-holder is of the proper size to contain a cover Y, and as the door closes (see Fig. 16) it pushes the cover Y completely into the cover-holder and fully opens or squares it. The opened cover is now directly in the path of motion of the box, and the folder $c^3$ pushes the filled and folded box onward thereinto. At the entrance end of the cover-holder the orifice is slightly contracted, so that the folded box shall not be pushed against the edge of the cover. One or more rollers L may at this orifice reduce the friction upon the box. At the same time that the door $m$ opens or squares the cover the door $m'$ closes against the force of the spring $m^4$ to prevent the cover from being pushed out of the holder by the motion or friction of the folded box as it is inserted thereinto. The end door $m'$ is pivoted along its top edge (see Fig. 17) and is closed by a cam $m^5$, which presses upon the pin $m^6$, attached to the door $m'$, and retains the door in a closed position until the folded box X is fully inserted into the cover Y. This cam is set on the shaft U, geared to the driving-shaft V, and the operations of the cams $m^3$ and $m^5$ are so timed that the side and end doors close as soon as the cover Y is delivered into the cover-holder from the magazine K. As soon as the folded and filled box X is fully inserted into the cover Y the cam $m^5$ completely disengages from the pin $m^6$ and the spring $m^4$ instantly opens the end $m'$ of the cover-holder to the full extent, and thereupon the folder $c^3$ pushes the box, now inserted in the cover, out through the opening to the delivery end of the machine. The magazines for the box-blanks, cigarettes, and covers, or any one or two of them, may be omitted, together with their respective feeding devices, but the speed of the machine must then be reduced to accommodate hand-feeding of the blanks, cigarettes, or covers.

To recapitulate: The bottom blank in the magazine D is pushed out of the magazine by a picker $c$ on the continuously-moving box-carrier or belt C into the channel F'. The sides of the channel, as the box progresses, partly fold the blank by bending up the side wings $e$ $e$. When this folding is nearly or quite complete, a full charge of the box-filling material is ejected into the moving box from the magazine G by the plunger $g^2$, with substantially the same velocity as the velocity of the box, whereby the box and the charge are relatively stationary and the charge drops into the box without receiving violent treatment. The folding-wires $h$ $h$ raise the advance end of the box and the folder $c^3$ raises the rear end of the box. The folding-wires $h$ $h$, aided by the action of the guide H⁵, turn down the flap e' upon the top of the charge of box-filling material, and the arms on the shafts H' and H² fold down the tip e³ in the same direction as that of the moving box. A flat tubular cover is removed from the magazine K and inserted into the opened box-holder in line with the path of motion of the box, the box-holder closes, thereby opens the cover, and the motion of the belt or box-carrier advances the box into the cover. As soon as the box is fully inserted into the cover the box-holder opens, releasing the covered box and is ready to receive another cover. These operations are timed to occur in continuous movement of the blank and box.

In the machine described at the same time that a blank is being removed from the magazine a partly-formed box is being filled with cigarettes and a formed and filled box is being covered. It is obvious that our machine may be easily adapted to filling and inserting slides into covers, both of which have been completely made outside of the machine, so that the formed slides and the formed covers may be fed from magazines placed similarly to the magazines D and K, and the machine shown will have to be only slightly modified. Our invention is not limited to the boxing of cigarettes.

Our machine also forms empty slides and places the covers about them without the internal supporting function of the filling material.

The modes of operation and the succession of operations in this machine constitute an important part of our invention.

Our machine is capable of many modifications which may be substituted for the mechanisms herein shown and which are within the scope of our invention, and hence we are not to be limited to the specific forms or combinations described or claimed herein.

What we claim is—

1. The combination of a continuously-moving box-carrier, devices for folding a blank while in motion to form a box, and mechanism coöperating with said box-carrier for inserting the formed box into a cover.

2. The combination of a continuously-moving box-carrier, devices for completely folding a blank while in motion to form a box, devices for filling the box while in motion, and mechanism for inserting the formed and filled box into a cover.

3. The combination of a moving box-carrier, devices for completely folding a blank while in motion upon said carrier to form a box, and mechanism coöperating with said carrier for inserting the formed box, while upon said carrier, into a cover.

4. The combination of a moving box-carrier, devices coöperating therewith for completely folding a blank while upon said carrier to form a box, other devices coöperating with said carrier for filling the box while in motion thereon, and mechanism coöperating with said carrier for inserting the formed and filled box into a cover.

5. The combination, with a box-channel, of mechanism for delivering a box-blank thereinto, mechanism for moving the blank in said channel, mechanism for completely forming the box from said blank while in motion, mechanism for filling said box while in motion, and mechanism for inserting the formed box into a cover.

6. The combination, with a box-channel, of mechanism for delivering a box-blank thereinto, mechanism for moving the blank in said channel, devices for forming first the sides and then the ends of the box from the blank while in motion, mechanism for filling said box while in motion, and mechanism for inserting the formed box into a cover.

7. The combination of a continuously-moving box-carrier, mechanism for delivering a box-blank thereto, devices for completely forming a box from the blank while in motion upon said carrier and mechanism coöperating with said carrier for inserting the formed box into a cover.

8. The combination, with a box-channel, of mechanism for delivering a box-blank thereinto, mechanism for moving the blank in said channel, guides acting on said blank and gradually bending the blank to form the sides of the box, mechanism for bending the ends of the blank to form the ends of the box, and mechanism coöperating with the mechanism for moving the blank in said channel for inserting the formed box into a cover.

9. The combination, with a box-channel, of mechanism for feeding a box-blank thereinto, mechanism for moving the blank in said channel, guides acting on said blank and gradually bending the blank to form the sides of the box, mechanism for bending the ends of the blank to form the ends of the box, and mechanism coöperating with the mechanism for moving the blank in said channel for inserting the formed box into a cover.

10. The combination, with a box-channel, of mechanism for feeding a box-blank thereinto, mechanism for moving the blank continuously in said channel, guides acting on said blank for gradually bending parts of the blank to form the sides of the box, mechanism for bending other parts of the blank to form both ends of the box, and mechanism for inserting the formed box into a cover.

11. The combination of a continuously-moving box-carrier, a box-channel wherein said carrier moves, mechanism for forming the sides and ends of a box-blank while in motion to form a box, and mechanism of which said box-carrier is an element for applying a cover to the formed box.

12. The combination, with a box-channel, of mechanism for delivering a box-blank thereinto, mechanism for moving the blank continuously in said channel, guides acting on said blank for gradually bending parts of the blank to form the sides of the box, mechanism for filling the box while in motion, mechanism for bending the blank to complete the box while in motion, and mechanism for inserting the formed box into a cover.

13. The combination of a continuously-moving carrier, mechanism for delivering a box-blank thereto, means for retaining said blank upon said carrier, mechanism for partly folding said box-blanks, mechanism for placing the filling material upon said blanks, mechanism for completely folding said blanks, and mechanism for inserting the filled and folded blanks into a cover, all during continuous movement of said blank.

14. The combination of a magazine containing flat box-blanks, a continuously-moving carrier and mechanism connected therewith for removing said box-blanks one by one from said magazine, a box-channel wherein said carrier moves, mechanism for forming the sides and ends of said box while in motion, and mechanism for applying a cover to said box.

15. The combination of a magazine containing flat box-blanks, a continuously-moving carrier and mechanism connected therewith for removing said blanks one by one from said magazine, mechanism for forming the sides and ends of the box from a blank while in motion, and mechanism for inserting the folded blank into a cover.

16. The combination of a magazine containing flat box-blanks, a continuously-moving carrier and mechanism connected therewith for removing said blanks one by one from said magazine, means for retaining said blanks upon said carrier, mechanism for forming the box from a blank while in motion, and mechanism for inserting the formed box into a tubular cover.

17. The combination of a magazine adapted to contain flat box-blanks, a continuously-moving carrier and mechanism thereon for removing said blanks one by one from said magazine, a channel for retaining said blanks on said carrier, guides in the sides of said channel for forming the sides of the box from the blank, mechanism upon said carrier for forming one end of the box from the blank, mechanism coöperating with said carrier for forming the other end of said box from said blank, a magazine containing tubular covers for said boxes, mechanism for extracting the covers one by one from the magazine and for inserting the same in the path of motion of said box, means for retaining the said cover in said path while the box is being inserted thereinto, and means for releasing the box when inserted in said cover.

18. The combination, with a box-carrying mechanism of mechanism for discharging the box-filling material into the moving box with substantially the same velocity as that of the box and means for delivering each filled box from said carrier.

19. The combination, with a continuously-operating box-carrying mechanism, of mechanism for discharging the box-filling material into the moving box with substantially the same velocity as that of the box and in the same direction and means for delivering each filled box from said carrier.

20. The combination with a moving box-carrying mechanism, of a magazine for box-filling material and mechanism for discharging a charge of the box-filling material from said magazine into the box, while in motion, and in the same direction as said motion and means for delivering each filled box from said carrier.

21. The combination with a moving box-carrying mechanism, of a magazine for the box-filling material and mechanism for discharging the box-filling material from said magazine into the box, while in motion, and in the same direction as said motion, and mechanism coacting with said box-carrying mechanism for applying a cover to said box while the same is in motion.

22. The combination with a box-carrying mechanism, of mechanism for first measuring a charge of the box-filling material and then discharging said charge into a box, while moved by said carrying mechanism, in the same direction as the motion of said box and means for delivering each filled box from said carrier.

23. The combination with a box-carrying mechanism, of mechanism for first measuring a charge of the box-filling material and then discharging said charge into a box, while moved by said carrying mechanism, in the same direction as the motion of said box, and mechanism coacting with said box-carrying mechanism for applying a cover to said box while moved by said carrier.

24. The combination, with a continuously-operating box-carrying mechanism, of mechanism for measuring and discharging the box-filling material into the moving box with substantially the same velocity as that of the box and in the same direction and means for delivering each filled box from said carrier.

25. The combination, with a continuously-moving box-carrying mechanism, of mechanism for discharging the box-filling material from a magazine into the moving box with substantially the same velocity as that of the box and in the same direction, and mechanism for covering said box.

26. The combination, with a continuously-operating box-carrying mechanism, of mechanism for feeding box-blanks thereto, mechanism for discharging the box-filling material into the partly-formed moving box with substantially the same velocity as that of the box and in the same direction, mechanism for completely forming the box, and mechanism for covering the box, all while said box is in continuous motion.

27. The combination of a magazine containing flat box-blanks, a continuously-moving belt having a device thereon for removing said blanks one at a time from said magazine and for retaining the same on said belt, a box-channel of which said belt is the bottom, means for folding the sides of said box from said blank, and means for folding the ends of said box, all while the box is in continuous motion.

28. The combination of a magazine adapted to contain flat box-blanks and having an aperture for the passage of the blanks therefrom, a continuously-moving belt having a series of devices thereon for removing said blanks one at a time from said magazine and for moving the same with said belt, a box-channel of which said belt is the bottom, devices for folding the sides of the box from said blank, devices for folding the ends of said box and devices for inserting the folded box in a cover, all while the box is in continuous motion.

29. The combination of a magazine adapted to contain flat box-blanks and having an aperture for the passage of the blanks therefrom, a continuously-moving belt having a series of devices thereon for removing said blanks one at a time from said magazine and for moving the same with said belt, a box-channel of which said belt is the bottom, devices for folding the sides of said box from said blank, devices for discharging a measured quantity of the box-filling material into said box, mechanism for folding the ends of said box, and mechanism for inserting the filled and folded box in a cover, all while the box is in continuous motion.

30. The combination of a magazine adapted to contain flat box-blanks and having an aperture for the passage of the blanks therefrom, a continuously-moving belt having a series of devices thereon for removing said blanks one at a time from said magazine and for moving the same with said belt, a box-channel of which said belt is the bottom, the sides of the channel being formed to fold the sides of the blank to form the sides of the box, a device upon said belt for folding one end of said box, a folder for folding the other end of said box, a magazine for box-covers, means for withdrawing one cover at a time therefrom, means for interposing a cover in the path of said folded box, means for retaining the cover in position while the box is being inserted thereinto, and means of releasing the covered box, all while the box is in continuous motion.

31. The combination of a moving box-carrier, devices for folding a blank while in motion to form a box, and mechanism coacting with said box-carrier for inserting the formed box, while moved by said carrier, into a cover.

32. The combination of a continuously-moving box-carrier, devices for folding a blank while in motion to form a box, and mechanism coacting with said box-carrier for inserting the formed box, while moved by said carrier, into a cover.

33. The combination of a moving box-carrier, devices coöperating therewith for completely folding a blank to form a box, and other devices coöperating with said carrier for filling the box, while moved by said carrier, with a charge of material which is discharged into the box by said last-named devices in the same direction as the movement of the box.

34. The combination of a moving box-carrier, devices coöperating therewith and external to the box-blanks for folding a blank to form a box, and other devices coöperating with said carrier for inserting a measured charge of box-filling material into said box while moved by said carrier.

35. The combination of a continuously-moving box-carrier, mechanism for automatically delivering a box-blank thereto, devices for forming a box from the blank while moved by said carrier, and mechanism coacting with said carrier for inserting the formed box, while moved by said carrier, into a cover.

36. The combination with a box-channel, of mechanism for moving a series of boxes successively in said channel, a magazine for the box-filling material, and mechanism for automatically discharging a charge of the box-filling material from said magazine into each box while in motion, and in the same direction as said motion and means for delivering each filled box from said carrier.

37. The combination with a box-channel, of mechanism for moving a series of boxes successively in said channel, a magazine for the box-filling material, and mechanism for automatically discharging a charge of the box-filling material from said magazine into each box while in motion, and in the same direction as said motion, and mechanism, coacting with said mechanism for moving said series of boxes, for applying a cover to each box.

38. The combination with a box-carrying mechanism, of a magazine adapted to contain a series of separated vertical columns of cigarettes or other like formed objects, and having a discharge-orifice at the base of said columns of such size as to permit the exit of a definite number of such objects, mechanism operating in time with said box-carrying mechanism for discharging said number of said objects through said orifice into the box as it moves from under said orifice and while in motion, said objects being discharged in the same direction as the motion of said box and with substantially the same velocity.

39. The combination with a box-carrying mechanism, of a magazine adapted to contain a series of separated vertical columns of cigarettes or other like formed objects, and having a discharge-orifice at the base of said columns of such size as to permit the exit of a definite number of such objects, mechanism operating in time with said box-carrying mechanism for discharging said number of said objects through said orifice into the box as it moves from under said orifice and while in motion, said objects being discharged in the same direction as the motion of said box and with substantially the same velocity, and mechanism coacting with said box-carrying mechanism for applying a cover to said box while moved by said carrier.

40. In a box-machine, the combination, with devices, as the guides F F and folders $c^3$ and $h$, for folding blanks to form boxes, a magazine D for said blanks having an exit-orifice $d^2$ at the base for a single blank and a slotted bottom $d$, of a series of pickers $c$ for removing one blank at a time each having a head $c^2$ provided with a forward edge, a traveling support, as the belt C, adapted to coöperate with said folding devices and bearing said series of pickers and movable to carry said heads through said slot, a spring, as $c'$, interposed between said head and said support, and means located at or about the entrance of said slot and over the path of said head adapted to depress the same, whereby said spring is compressed and said edge is caused to enter between the lowest blank in said magazine and the next superior blank.

41. In a blank-delivering device, the combination of a magazine, as D, adapted to contain blanks and having an exit-orifice $d^2$ at the base for a single blank and a slotted bottom $d$, a series of pickers $c$ for removing one blank at a time from said magazine, each having a head $c^2$ provided with a forward edge, a support, as the belt C, adapted to carry said series of pickers and movable to carry said heads through said slot, a bow-spring, as $c'$, fastened at one end to said support and resting freely on said support at the other end and raised from said support in the middle and having said head $c^2$ fastened upon the highest point of said spring, means located at or near the entrance of said slot and near the path of said head and adapted to depress the same, whereby said spring is compressed and said edge is caused to enter between the lowest blank in said magazine and the next superior blank.

42. In a box-machine, the combination of devices for folding blanks to form boxes, a magazine, as D, adapted to contain blanks and having an exit-orifice $d^2$ at the base for a single blank and a slotted bottom $d$, a series of pickers $c$ for removing one blank at a time from said magazine, each having a head provided with a forward edge, a traveling support adapted to coöperate with said folding devices and bearing said series of pickers and movable to carry said heads through said slot, a bow-spring, as $c'$, fastened at one end to said support and resting freely on said support at the other end and raised from said support in the middle and having said head fastened upon the highest point of said spring, means located at or near the entrance of said slot and near the path of said head and adapted to depress the same, whereby said spring is compressed and said edge is caused to enter between the lowest blank in said magazine and the next superior blank, together with devices coöperating with said traveling support for applying a cover to the folded box.

43. The combination of a box-carrier, devices for operating externally upon a moving blank for folding the same to form an open box, and mechanism coacting with said box-carrier for inserting the formed box, while moved by said carrier, into a cover.

44. The combination of a moving box-carrier, means for automatically delivering successive box-blanks thereto, devices external to the blanks and coöperating with said carrier to fold each blank while in motion to form an open box adapted to receive filling material, and devices for filling the box while moved by said carrier with a charge of material which is discharged into the box in the same direction as the movement of the box.

45. The combination of a continuously-moving box-carrier, mechanism for delivering successive box-blanks thereto, devices external to said blanks and coöperating with said box-carrier to fold each blank to form an open box while in motion upon the said carrier adapted to receive filling material, devices for filling the box while moved by said carrier with a charge of material, which is discharged into the box in the same direction as the motion of the box, and mechanism coacting with said carrier for inserting the formed box, while moved by said carrier, into a cover.

46. The combination, with a box-carrier and devices coöperating therewith for forming boxes from blanks carried thereby, of mechanism adapted to open a collapsed cover and to retain the same in the path of said box-carrier, whereby the box is inserted into said cover, together with an apparatus for automatically delivering collapsed covers, one by one, into said mechanism.

47. The combination, with devices for advancing a formed box endwise, of a cover-holder which receives the flattened tubular cover, means whereby a part of the holder is caused to open said cover and to retain the opened cover in the path of the advancing box.

48. The combination, with devices for advancing a formed box endwise, of a cover-holder which receives the flattened tubular cover, means whereby a part of the holder is caused to open said cover and to retain the opened cover in the path of the advancing box, together with an independent mechanism for feeding flattened covers one by one into said cover-holder.

49. The combination with devices for advancing a formed box endwise, of a cover-holder which receives a flattened tubular cover, means whereby the holder opens to receive the same and, by closing, opens said tubular cover and holds the same in the path of the advancing box, together with an independent mechanism for feeding such flattened covers, one by one, into said cover-holder.

50. The combination, with devices for advancing a formed box endwise, of a cover-holder set in the path of such advancing box and having an opening side, a magazine for tubular covers, a plunger, provided with devices for extracting one cover at a time from said magazine, for moving said cover directly into said cover-holder, and means for securing said tubular cover inside said cover-holder and for retaining the same in the path of said advancing box.

51. The combination, with mechanism for advancing a formed box endwise, of a cover-holder in the path of said advancing box and having a hinged side and adapted to receive a flattened tubular cover through the opened side and to open the cover by closing said side, and independent devices for feeding flattened covers through said opened side.

52. The combination, with mechanism for advancing a formed box endwise, of a cover-holder in the path of said advancing box and having an opening side and adapted to receive a flattened tubular cover through the opened side and to open the cover by closing said side, in combination with devices for feeding flattened covers through said opened side into the path of the said advancing box, and a gate on the end of said cover-holder adapted to close and retain the cover therein until the box is inserted and then to open for the discharge of the covered box.

53. In a box-machine, a magazine adapted to contain flattened tubular covers and having a throat adapted to permit only one flattened cover to emerge therefrom, a box-carrier adapted to advance formed boxes endwise, a cover-holder in the path of said box-carrier having an open end on the side of the approaching box and an opening side adjacent to said throat, devices for removing flattened covers one at a time from said magazine and for delivering the same through the opening side into said cover-holder, and means for opening and closing said opening side, whereby said cover is admitted into and is opened and secured inside the cover-holder and in the path of the advancing box.

54. The combination, with a box-carrier adapted to advance box-blanks longitudinally thereon and means of folding the sides and ends of box-blanks substantially of the form described, of mechanism for folding the top flaps of such box-blanks consisting of a folder-wheel, placed above the path of motion of the box and at a height to come in contact with the said top flaps and revolving in a direction to fold the flaps down upon the moving boxes in the same direction as the motion of the boxes.

55. The combination, with a box-carrier adapted to advance box-blanks longitudinally thereon and means of folding the sides and ends of box-blanks substantially of the form described, of mechanism for folding the top flaps of such box-blanks consisting of a folding-wheel having a serrated periphery placed above the path of motion of the box and at a height to strike said top flaps and revolving in a direction to fold the flaps down upon the moving boxes in the same direction as the motion of the boxes.

56. The combination, with a box-carrier adapted to carry box-blanks of the form described longitudinally thereon, means for folding the sides and ends of said box-blanks, means for folding the top flaps of said blanks upon said box while in motion, consisting of the lifting folder-wires $h\ h$ and one or more folder-wheels, as $H^3\ H^5$, placed above the path of motion of the box and at a height to come in contact with said top pieces and to fold the rear flap upon the moving box in the same direction as the motion of the carrier and revolving more rapidly than the motion of the box-carrier.

57. The combination with a box-carrier adapted to carry box-blanks of the form described longitudinally thereon, means of folding the sides and ends of said box-blanks, means for folding the top flaps of said blanks upon said box while in motion, consisting of the lifting folder-wires $h\ h$ and one or more folder-wheels, as $H^3\ H^5$, placed above the path of motion of the box and at a height to come in contact with said top flaps and to fold the rear flap upon the moving box in the same direction as the motion of the box-carrier and revolving more rapidly than the motion of the box-carrier, and means for inserting the folded box-blanks into a tubular cover.

58. The combination of a box-carrier adapted to carry box-blanks of the form described longitudinally thereon and means for folding the side wings of the blank, the folder-rods $h\ h$ operated substantially as described to lift and fold the flap $e'$, and one or more folder-wheels, as $H^3$ and $H^5$ having arms peripherally revolving at greater velocity than the velocity of the box-carrier and adapted to fold down the flap $e^3$ in the same direction as the motion of the carrier.

59. In a box-machine, the combination of a channel having stationary sides changing gradually from horizontal to vertical, means for directing flat box-blanks having wing-pieces to form the sides and ends thereof into said channel at or before the point where the sides of the channel change from the horizontal, a belt moving continuously in said channel and provided with mechanism external to the blanks for moving the separate blanks longitudinally along in said channel, whereby the sides are folded, and means for folding both ends of the box.

60. In a box-machine, the combination of a channel having stationary sides changing gradually from horizontal to vertical, means for directing flat box-blanks having wing-pieces to form the sides and ends thereof into said channel at or before the point where the sides of the channel change from the horizontal, a box-carrier moving in said channel and provided with mechanism for moving the separate blanks longitudinally in said channel whereby the sides are folded, and means for folding the front and rear ends of the box.

61. In a box-machine, the combination of a channel having stationary sides changing gradually from horizontal to vertical, means for directing flat box-blanks having wing-pieces to form the sides and ends thereof, into said channel at or before the point where the sides of the channel change from the horizontal, a box-carrier moving in said channel and provided with mechanism external to the blanks for moving the separate blanks longitudinally in said channel whereby the sides are folded, and means for folding the front and rear ends of the box.

62. In a box-machine, the combination of a channel having stationary sides changing gradually from horizontal to vertical, means for directing flat box-blanks having wing-pieces to form the sides and ends thereof into said channel at or before the point where the sides of the channel change from the horizontal, a box-carrier moving in said channel and provided with mechanism for moving the separate blanks longitudinally in said channel whereby the sides are folded, means for folding the front and rear ends of the box, and a cover-holder set over said box-carrier and adapted to receive and hold a cover for said box, whereby the cover is applied to the box as the latter is moved along by said carrier.

63. In a box-machine, the combination of a channel having stationary sides changing gradually from horizontal to vertical, means for directing box-blanks having wing-pieces to form the sides and ends thereof into said channel at or before the point where the sides of the channel begin to change from the horizontal, and a carrier moving in said channel, whereby the sides are folded, one or more depressible transverse folders upon said belt, means for raising each folder to form one end of the box, and means for forming the other end of the box.

64. In a box-machine, the combination of a channel having stationary sides changing gradually from horizontal to vertical, means for directing box-blanks having wing-pieces to form the sides and ends thereof into said channel at or before the point where the sides of the channel begin to change from the horizontal, and a carrier moving continuously in said channel whereby the sides are folded, one or more depressible transverse folders upon said carrier, means for raising each folder to form the rear end of a box, and a lifting-folder adapted to catch, raise and fold the forward end of the box while in motion.

65. In a machine for forming boxes from flat cruciform blanks consisting, substantially, of a center E, wings $e$ $e$ to form the sides, wings $e^2$, $e^4$ to form the ends of the box, an extended flap $e'$ on one end of the blank to form one part of the top and a flap $e^3$ on the other end of the blank to complete the top, means for delivering said flat blanks one at a time to a continuously-moving carrier with the flap $e'$ forward, a channel in which said carrier moves having sides changing gradually from horizontal to vertical whereby the wings $e$ $e$ are gradually bent to form the sides of the moving box, one or more depressible folders upon said carrier, means for raising each folder to bend the rear wing $e^2$ to form one end of the box, and a lifting-folder adapted to catch and lift the forward end of the flap $e'$ with the end $e^4$ and to bend the same and to raise said flap and end into the vertical position, and then to bend down the flap $e'$, and means as a revolving wheel or wiper, moving with greater peripheral velocity than the belt, for striking and bending the flap $e^3$ over the box, and means for inserting the folded box into a cover.

66. The combination of a moving box-carrier, devices for folding a blank while in motion upon said carrier to form a box, and means for holding a tubular cover in the line of movement of the carrier whereby the box is inserted into the cover by the movement of the carrier.

67. The combination of a moving box-carrier, devices for folding a blank while in motion upon said carrier to form a box, devices for filling the box while in motion, and means for holding a tubular cover in the line of movement of the carrier whereby the box is inserted into the cover by the movement of the carrier.

68. The combination of a moving box-carrier, devices coöperating with said carrier for folding a blank to form a box, means for holding a tubular cover in the line of movement of the carrier whereby the box is inserted into the cover by the movement of the carrier, and means for releasing the covered box from said holding device.

69. The combination of a moving box-carrier, devices coöperating with said carrier for folding a blank to form a box, other devices coöperating with said carrier for filling the box while in motion thereon, means for holding a tubular cover in the line of movement of the carrier whereby the box is inserted into the cover by the movement of the carrier, and means for releasing the covered box from said holding device.

70. The combination of a magazine adapted to contain flat box-blanks, a continuously-moving belt having a device thereon for removing said blanks one at a time from said magazine and for retaining the same on said belt, a box-channel of which said belt is the bottom, means for folding the sides of said box from said blank, means for folding the ends of the box, means for holding a tubular cover in the line of movement of the belt whereby the box is inserted into the cover by the movement of the belt, and means for releasing the covered box from said holder, all while the box is in continuous motion.

71. The combination of a magazine adapted to contain flat box-blanks, a moving belt having devices thereon for removing said blanks one at a time from said magazine and for retaining the same on said belt, a box-channel of which said belt is the bottom, means for folding the sides of said box from said blank, and means for folding the ends of said box, all while the box is moved by said belt.

72. The combination, with a box-channel, of mechanism for delivering a box-blank thereinto, a mechanism for moving the blank in said channel, guides acting on said blank and gradually bending the blank to form the sides of the box, and mechanism for bending the ends of the blank to form the ends and top of the box, whereby to form a completely-closed box without apparatus acting internally on said blank.

73. The combination of a moving box-carrier adapted to carry a series of box-blanks, mechanism coöperating with said carrier for bending the blank to form the sides of the box, mechanism for bending the ends of the blank to form the ends and top of the box whereby to form a completely-closed box without apparatus acting internally on said blank.

CHARLES W. VAN VLEET.
JAMES P. OSBORNE.

Witnesses:
M. H. McMATH,
JOHN P. BOWMAN.